United States Patent [19]

Ashi et al.

[11] Patent Number: 5,721,727
[45] Date of Patent: Feb. 24, 1998

[54] CONTROL METHOD AND APPARATUS FOR PATH SWITCHING IN RING NETWORK

[75] Inventors: Yoshihiro Ashi; Masahiro Takatori, both of Yokohama, Japan

[73] Assignee: Hitachi, Ltd., Tokyo, Japan

[21] Appl. No.: 534,938

[22] Filed: Sep. 28, 1995

[30] Foreign Application Priority Data

Sep. 29, 1994 [JP] Japan .................................. 6-235251

[51] Int. Cl.$^6$ .................................................. H04J 3/14
[52] U.S. Cl. .......................................... 370/244; 370/248
[58] Field of Search ............................. 370/16.1, 16, 60, 370/60.1, 360, 389, 392, 409, 241, 242, 244, 248, 250; 371/11.2, 20.1; 359/110, 110.1

[56] References Cited

U.S. PATENT DOCUMENTS

| | | | |
|---|---|---|---|
| 5,003,531 | 3/1991 | Farinholt et al. | 370/16.1 |
| 5,093,824 | 3/1992 | Coan et al. | 370/16 |
| 5,187,706 | 2/1993 | Frankel et al. | 370/16.1 |
| 5,278,824 | 1/1994 | Kremer | 370/15 |
| 5,307,353 | 4/1994 | Yamashita et al. | 371/11.2 |
| 5,341,364 | 8/1994 | Marra et al. | 370/16.1 |
| 5,406,401 | 4/1995 | Kremer | 359/110 |
| 5,446,725 | 8/1995 | Ishiwatari | 370/16.1 |

OTHER PUBLICATIONS

Bellcore Technical Advisory, TA–NWT–001230, Issue 3, Apr. 1993, Sonet Bidirectional Line–Switched Ring Equipment Generic Criteria.

Bellcore Technical Reference, TR–NWT–000496, Issue 3, May 1992, Sonet Add–Drop Multiplex Equipment (Sonet ADM) Generic Criteria.

Bellcore Generic Requirements, GR–1230–CORE, Issue 1, Dec. 1993, Sonet Bidirectional Line–Switched Ring Equipment Generic Criteria.

Bellcore Generic Requirements, GR–1400–CORE, Issue 1, Mar. 1994, Sonet Dual–Fed Unidirectional Path Switched Ring (UPSR) Equipment Generic Criteria.

*Primary Examiner*—Douglas W. Olms
*Assistant Examiner*—Kwang Bin Yao
*Attorney, Agent, or Firm*—Antonelli, Terry, Stout & Kraus, LLP

[57] ABSTRACT

A method of switching a route path of a ring network having a plurality of route paths for signal transmission, in which a transmission station on a transmission side transmits information of a same content to said plurality of route paths, a transmission station on a reception side selects one of the plurality of route paths, and a failure on the selected route path is automatically retrieved. The method includes the steps of: monitoring whether a signal received on each route path is normal or not; loading failure information as a path status identifier in a predetermined field of the signal received on each route path, the failure information indicating whether the monitoring step has detected a failure; and selecting one of the plurality of route paths in accordance with the failure information and predetermined logic.

29 Claims, 9 Drawing Sheets

VALUE OF V4
FAILURE DETECTION:00000001
NO FAILURE DETECTION:00000000

FIG. 9

| STATUS OF ACTIVE PATH | STATUS OF RESERVED PATH | OPERATION OF PATH SELECTING UNIT |
|---|---|---|
| NO FAILURE DETECTION (V4=00000000) | NO FAILURE DETECTION (V4=00000000) | MAINTAIN CURRENT CONDITIONS |
| NO FAILURE DETECTION (V4=00000000) | FAILURE DETECTION (V4=00000001) | SELECT ACTIVE PATH |
| FAILURE DETECTION (V4=00000001) | NO FAILURE DETECTION (V4=00000000) | SELECT RESERVED PATH |
| FAILURE DETECTION (V4=00000001) | FAILURE DETECTION (V4=00000001) | MAINTAIN CURRENT CONDITIONS |

FIG. 10

| STATUS OF PATH | VALUE OF PATH STATUS IDENTIFER (V4 BYTE) |
|---|---|
| NO FAILURE DETECTION | V4=00000000 |
| SOFT FAILURE DETECTION | V4=00000001 |
| HARD FAILURE DETECTION | V4=00000011 |

FIG. 11

| STATUS OF ACTIVE PATH | STATUS OF RESERVED PATH | OPERATION OF PATH SELECTING UNIT |
|---|---|---|
| NO FAILURE DETECTION (V4=00000000) | NO FAILURE DETECTION (V4=00000000) | MAINTAIN CURRENT CONDITIONS |
| NO FAILURE DETECTION (V4=00000000) | SOFT FAILURE DETECTION (V4=00000001) | SELECT ACTIVE PATH |
| NO FAILURE DETECTION (V4=00000000) | HARD FAILURE DETECTION (V4=00000011) | SELECT ACTIVE PATH |
| SOFT FAILURE DETECTION (V4=00000001) | NO FAILURE DETECTION (V4=00000000) | SELECT RESERVED PATH |
| SOFT FAILURE DETECTION (V4=00000001) | SOFT FAILURE DETECTION (V4=00000001) | MAINTAIN CURRENT CONDITIONS |
| SOFT FAILURE DETECTION (V4=00000001) | HARD FAILURE DETECTION (V4=00000011) | SELECT ACTIVE PATH |
| HARD FAILURE DETECTION (V4=00000011) | NO FAILURE DETECTION (V4=00000000) | SELECT RESERVED PATH |
| HARD FAILURE DETECTION (V4=00000011) | SOFT FAILURE DETECTION (V4=00000001) | SELECT RESERVED PATH |
| HARD FAILURE DETECTION (V4=00000011) | HARD FAILURE DETECTION (V4=00000011) | MAINTAIN CURRENT CONDITIONS |

CONTROL METHOD AND APPARATUS FOR PATH SWITCHING IN RING NETWORK

BACKGROUND OF THE INVENTION

The present invention relates to a path switching transmission station, and more particularly to a path switching control method and apparatus for a ring network with automatic failure retrieval.

Known as a ring network with automatic failure retrieval are a 2-fiber bidirectional line switched ring (2-Fiber BLSR), a 4-fiber bidirectional line switched ring (4-Fiber BLSR) and an unidirectional path switched ring (UPSR), as described in "Bellcore Technical Advisory TA-NWT-001230, issue 3".

The specification concerning UPSR is described in TR-NWT-000496 issue 3 "SONET Add-Drop Multiplex Equipment (SONET ADM) Generic Criteria" produced by Bellcore, May, 1992, and GR-1400-CORE issue 1 "SONET Dual-Fed Unidirectional Path Switched Ring Equipment Generic Criteria" produced by Bellcore, March 1994.

These ring networks are all called a synchronous optical network (SONET) and use a transmission frame standardized by American National Standards Institute (ANSI).

FIG. 1 is a schematic diagram illustrating the structure of a transmission frame used by SONET. This transmission frame will be described in the following.

The frame shown in FIG. 1 is a transmission frame called an STS-1 frame which is standardized and the detailed description thereof is not necessary. This frame has a transmission speed of 51.84 Mb/s and can accommodate twenty eight low speed signal paths of VT1.5 (transmission speed of 1.5 Mb/s). This invention is directed to an STS-3 frame signal (transmission speed of 155.52 Mb/s) which has STS-1 frames 20 interleaved in units of byte. Each STS-3 frame can accommodate eighty four VT1.5 signal paths.

In FIG. 1, reference numeral 21 represents a field called a synchronous payload envelope (SPE) of the sts-1 frame 20. Reference numeral 22 represents an STS pointer constituted by two bytes H1 and H2 and indicating a shift amount of data from a reference point of a data frame. Reference numeral 23 represents a path overheads (POH) field written in which is data management information indicating as generation of any error and occurrence of any failure.

The invention is applied to a UPSR network among the above-described three types of ring networks.

FIG. 2 is a schematic diagram showing the structure of a UPSR network. In FIG. 2, reference numerals 30-1 to 30-4 represent a transmission station (hereinafter called a node), reference numerals 31-1 to 31-8 represent a line, reference numerals 32-1 and 32-3 represent an active path, reference numerals 32-2 and 32-4 represent a reserved path, reference numeral 6 represents a path switching unit, reference numeral 12 represents an add line, and reference numeral 13 represents a drop line.

As shown in FIG. 2, in the UPSR network, the nodes 30-1 to 30-4 are interconnected by two paths constituted by the lines 31-1 to 31-8. Of the two paths, one is used as an active path and the other is used as a reserved path. In the example shown in FIG. 2, the path in the counter clockwise (CCW) direction is used as the active path, and the path in the clockwise (CW) direction is used as the reserved path.

In the UPSR network shown in FIG. 2, if a signal is transmitted from the node 30-1 to the node 30-4, the active path 32-1 among the active and reserved path between both the node is selected by a path selecting unit 6 of the path terminating node 30-4. When the active path 32-1 fails between the nodes 30-2 and 30-1, the path selecting unit 6 of the path terminating node 30-4 selects the reserved path 32-2 to evade and retrieve the failure.

FIG. 3 is a block diagram showing the structure of a conventional node. FIG. 4 is a block diagram showing the structure of a reception interface unit shown in FIG. 3. In FIGS. 3 and 4, reference numerals 2-1 and 2-2 represent a transmission interface unit, reference numeral 3 represents an add interface unit, reference numeral 4 represents a drop interface unit, reference numeral 5 represents a switch, reference numeral 6-2 represents a path selecting unit, reference numerals 7-1 and 7-2 represent a reception interface unit, and reference numerals 15-1 and 15-2 represent a switching information transmission line.

As shown in FIG. 3, the conventional node has the reception interface units 7-1 and 7-2, transmission interface units 2-1 and 2-2, add interface unit 3, drop interface unit 4, switch 5, path selecting unit 6-2 having a path switching function, and switching information transmission lines 15-1 and 15-2 for transmitting control information to the reception interface units 7-1 and 7-2. Each indicated at 7 in FIG. 4 of the reception interface units 7-1 and 7-2 has an optical/electrical converter unit 40, an overheads processing circuit 41, and a failure detecting circuit 42.

Assuming that the node shown in FIG. 3 is the node 30-4 of the network shown in FIG. 2, a CW input transmission line 10-2 corresponds to the line 31-3 of FIG. 2, a CCW input transmission line 10-1 corresponds to the line 31-2 of FIG. 2, a CW output transmission line 11-2 corresponds to the line 31-6 of FIG. 2, and a CCW output transmission line 11-1 corresponds to the line 31-7 of FIG. 2. Output highways 16-3 and 16-4 of the switch 5 transmit signals received from the active and reserved paths. The path selecting unit 6-2 selects either the active path or the reserved path. Each node accommodates the add line 12 and the drop line 13 in addition to the ring line.

Next, a conventional path switching operation will be described with reference to FIGS. 3 and 4.

It is assumed that a failure has occurred on the active path 32-1 of the network shown in FIG. 2. In this case, the failure is detected by the failure detecting circuit 42 (FIG. 4) of the reception interface unit 7-1. This failed path status is transmitted via the switching information transmission line 15-1 to the path selecting unit 6-2. In response to a notice of an active path failure from the switching information transmission line 15-1, the path selecting unit 6-2 selects the reserved path 32-2.

With the above operations, the node can evade and retrieve the failure.

With the above-described conventional technique, each node transmits a failure status of each signal path to the path selecting unit 6-2 by using one of the switching information transmission lines 15-1 and 15-2 which are provided separately from the main signal. Assuming that each low speed signal path of VT1.5 is to be switched, eighty four paths are required for the case of an STS-3 format, i.e., eighty four switching information signal lines such as the lines 15-1 and 15-2 are required. A problem of a number of switching information signal lines therefore arises.

SUMMARY OF THE INVENTION

It is an object of the present invention to solve the above problem associated with the conventional technique and provide a path switching control method and apparatus capable of realizing a path switching function with a simple structure, without using switching information transmission lines between a reception interface unit and a path selecting unit.

The above object of the invention can be achieved by the provision of a method of controlling switching of a route path of a network in which a plurality of route paths are set for signal transmission, a transmission station on a transmission side transmits information of the same contents to said plurality of route paths, a transmission station on a reception side selects one of the plurality of route paths, and a failure on the selected route path is automatically retrieved. The method including the steps of: monitoring whether a signal received on each route path is normal or not; loading failure information as a path status identifier in a predetermined field of the signal received on each route path, the failure information indicating whether the monitoring step has detected a failure; and selecting one of the plurality of route paths in accordance with the information of the path status identifier and predetermined logic.

Specifically, the object of the invention can be achieved by the provision of an apparatus comprising: means for detecting a failure for each of a plurality of interleaved signals transmitted over each of the plurality of signal paths; means for loading failure information as a path status identifier in a predetermined field of a signal transmitted over the signal path, the failure information indicating whether a failure has been detected on the signal path; and means for selecting one of the plurality of route paths in accordance with information of the path status identifier and predetermined logic.

According to the present invention, a reception interface unit in each node can detect a failure for each of a plurality of interleaved signals transmitted over each of the plurality of signal paths, and the detected failure information is loaded on the signal transmitted over the route path and passed to a path selecting unit. Accordingly, without receiving information from a switching information transmission line, the path selecting unit can judge the path status from the information loaded in a received signal. If it is judged that a failure is detected on a route path currently selected, a route path not currently selected is selected and the failure can be evaded and retrieved.

As described above, according to the present invention, when a failure is detected on an active signal path, a reception interface unit of a transmission station loads the failure information in a predetermined field of a signal on the failed signal path. Accordingly, the path selecting unit can operate to switch the active signal path to a reserved signal path. Therefore, according to the invention, a path can be switched while dispensing with a switching information transmission line for each signal path between the reception interface unit and the path selecting unit. A path switching transmission station with a simple hardware arrangement can thus be realized.

BRIEF DESCRIPTION OF THE DRAWINGS

FIG. 9 is a table illustrating examples of operation logic of the path selecting unit.

FIG. 10 is a table illustrating an example of path identifiers discriminating a level of path failure.

FIG. 11 is a table illustrating examples of path selection logic to be performed depending upon a level of path failure.

DETAILED DESCRIPTION OF THE PREFERRED EMBODIMENTS

An embodiment of a path switching transmission station of this invention will be described in detail with reference to the accompanying drawings.

Figure 5:
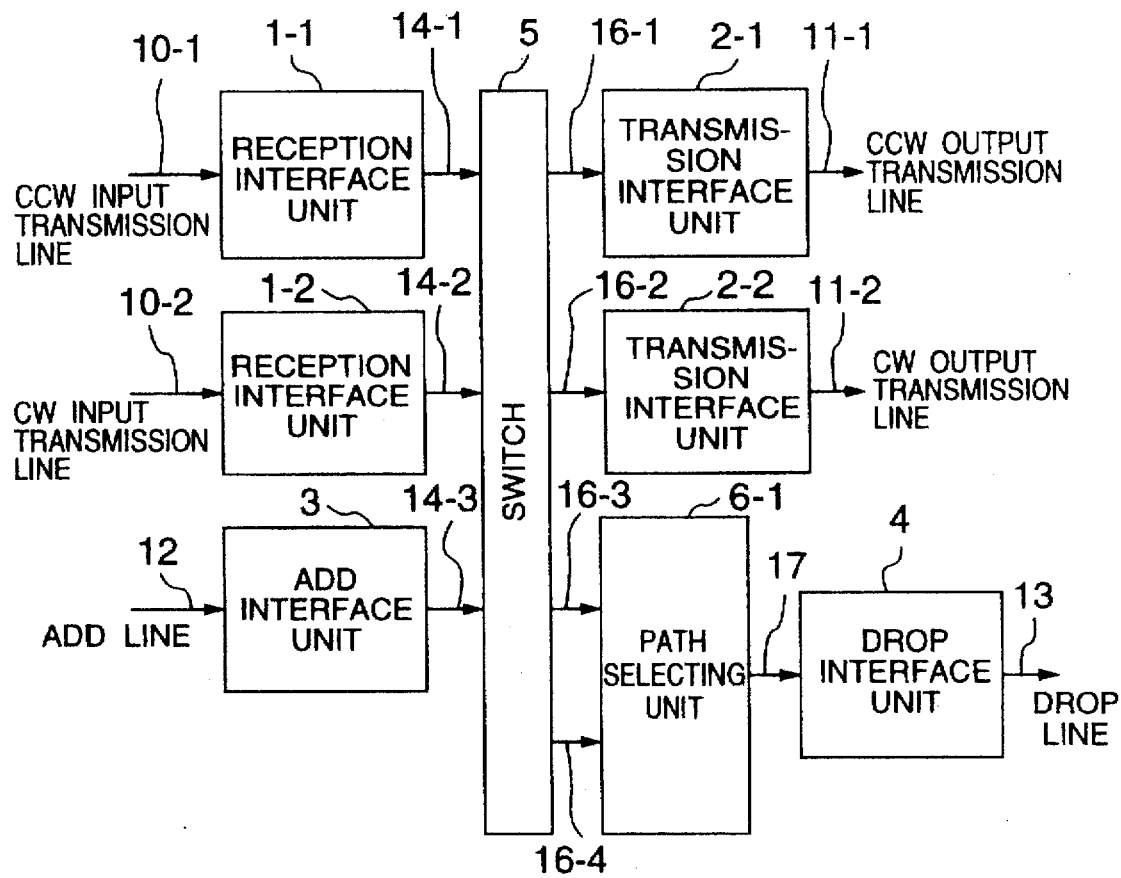
FIG. 5 is a block diagram showing the structure of a node according to an embodiment of the invention.
Figure 6:
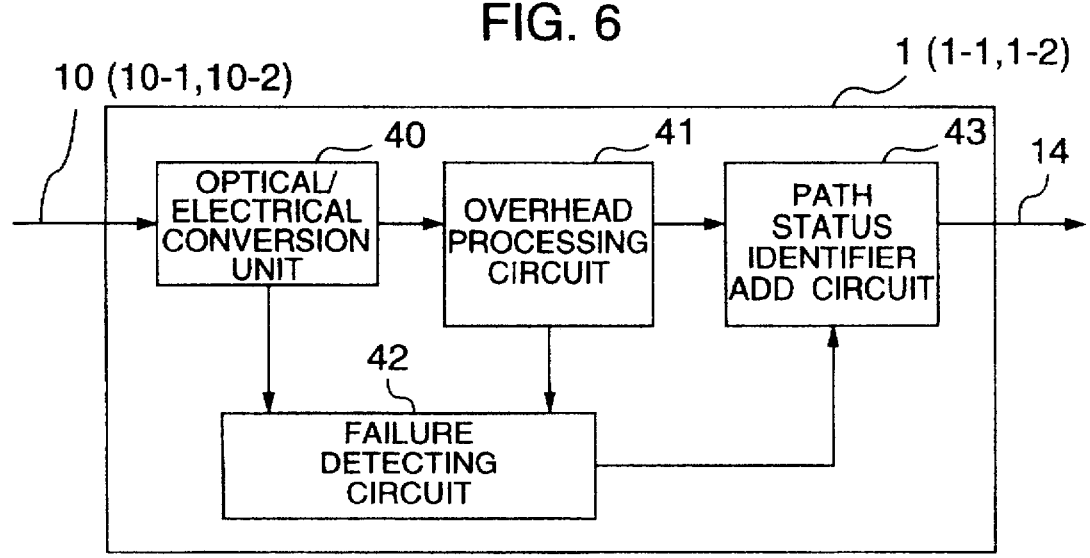
FIG. 6 is a block diagram showing the structure of a reception interface unit shown in FIG. 5.
Figure 7:
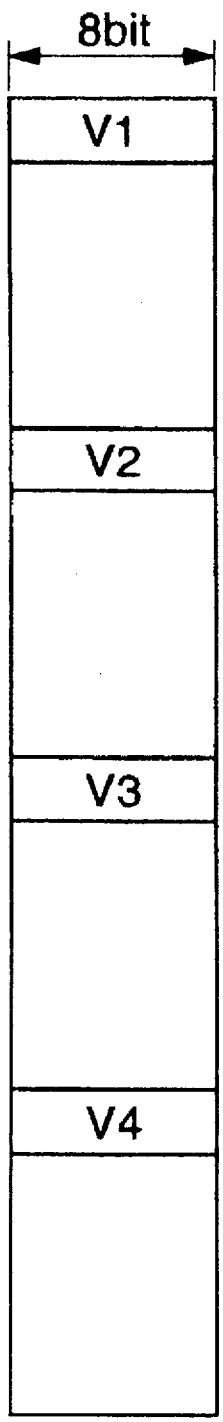
FIG. 7 is a schematic diagram illustrating a path status identifier for VT path.
Figure 8:
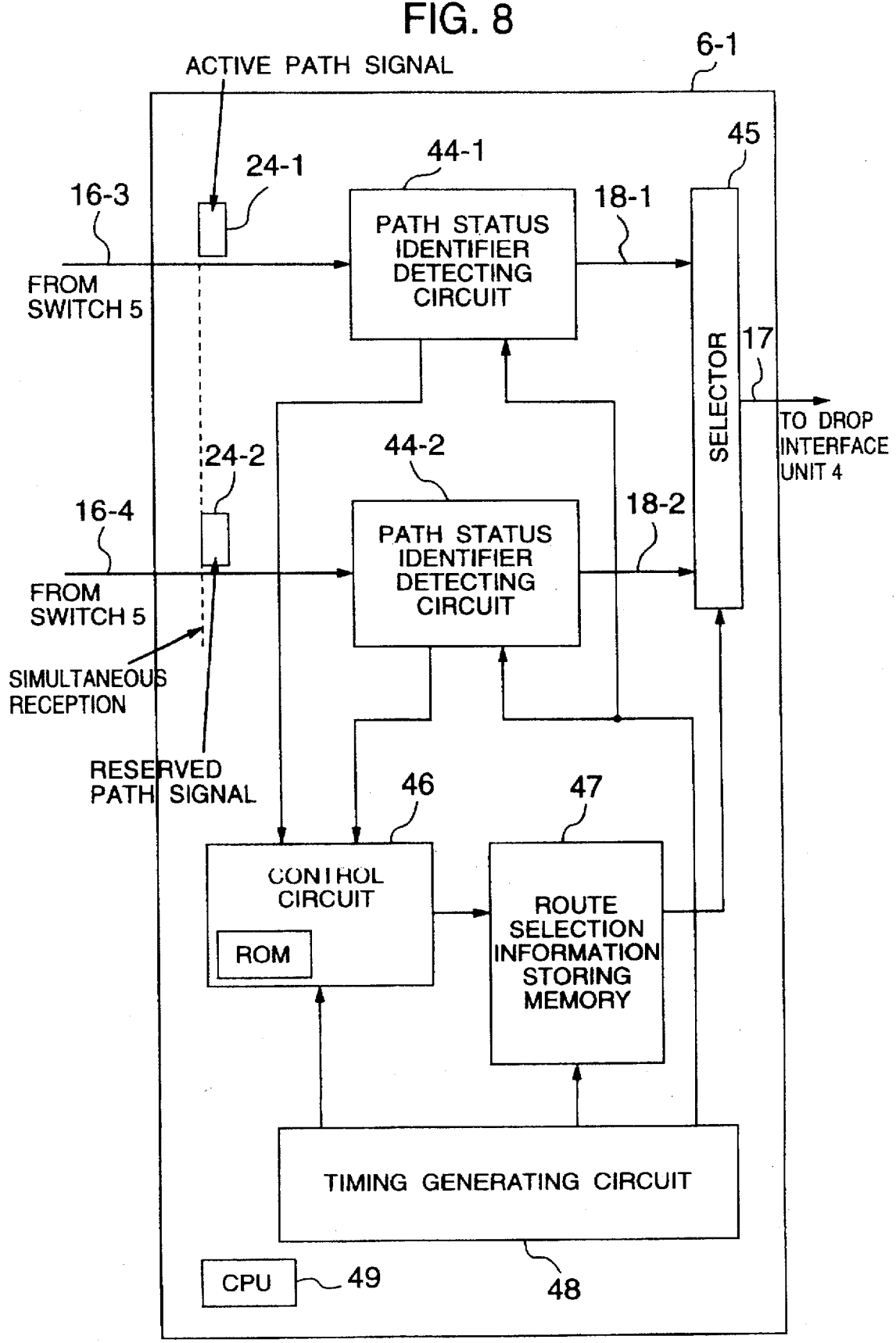
FIG. 8 is a block diagram showing the structure of a path selecting unit shown in FIG. 5.

FIG. 5 is a block diagram showing the structure of a node according to an embodiment of the invention, FIG. 6 is a block diagram showing the structure of a reception interface unit shown in FIG. 5, FIG. 7 is a schematic diagram illustrating a path status identifier for VT path, FIG. 8 is a block diagram showing the structure of a path selecting unit shown in FIG. 5, and FIG. 9 is a table illustrating examples of operation logic of the path selecting unit. In FIGS. 5 to 8, reference numerals 1-1 and 1-2 represent a reception interface unit, reference numeral 43 represents a path status identifier add circuit, reference numeral 6-1 represents a path selecting unit, reference numerals 44-1 and 44-2 represent a path status identifier detecting circuit, reference numeral 45 represents a selector, reference numeral 46 represents a control circuit, reference numeral 47 represents a route selection information storing memory, and reference numeral 48 represents a timing generating circuit. Other reference numerals represent corresponding similar elements to those shown in FIGS. 1 to 4.

As shown in FIG. 5, a node according to an embodiment of the invention has the reception interface units 1-1 and 1-2, transmission interface units 2-1 and 2-2, a switch 5 having a path setting function, and the path selecting unit 6-1 provided for each path and having a path switching function. Although this node is basically the same as a conventional node, it is not provided with the switching information transmission lines 15-1 and 15-2.

The structure of a network in which nodes of this embodiment are used is the same as a conventional network described with reference to FIG. 2. A transmission frame used in this embodiment is assumed to use an STS-3 (155.52 Mb/s) signal standardized by ANSI previously described with reference to FIG. 1.

As already described, a transmission frame for an STS-3 signal accommodates eighty four interleaved VT1.5 signals. The STS-3 frame signal is inputted to the reception interface units 1-1 and 1-2 of the node shown in FIG. 5. The switch 5 has a path setting function for each path unit of VT1.5 signal path.

Figure 1:
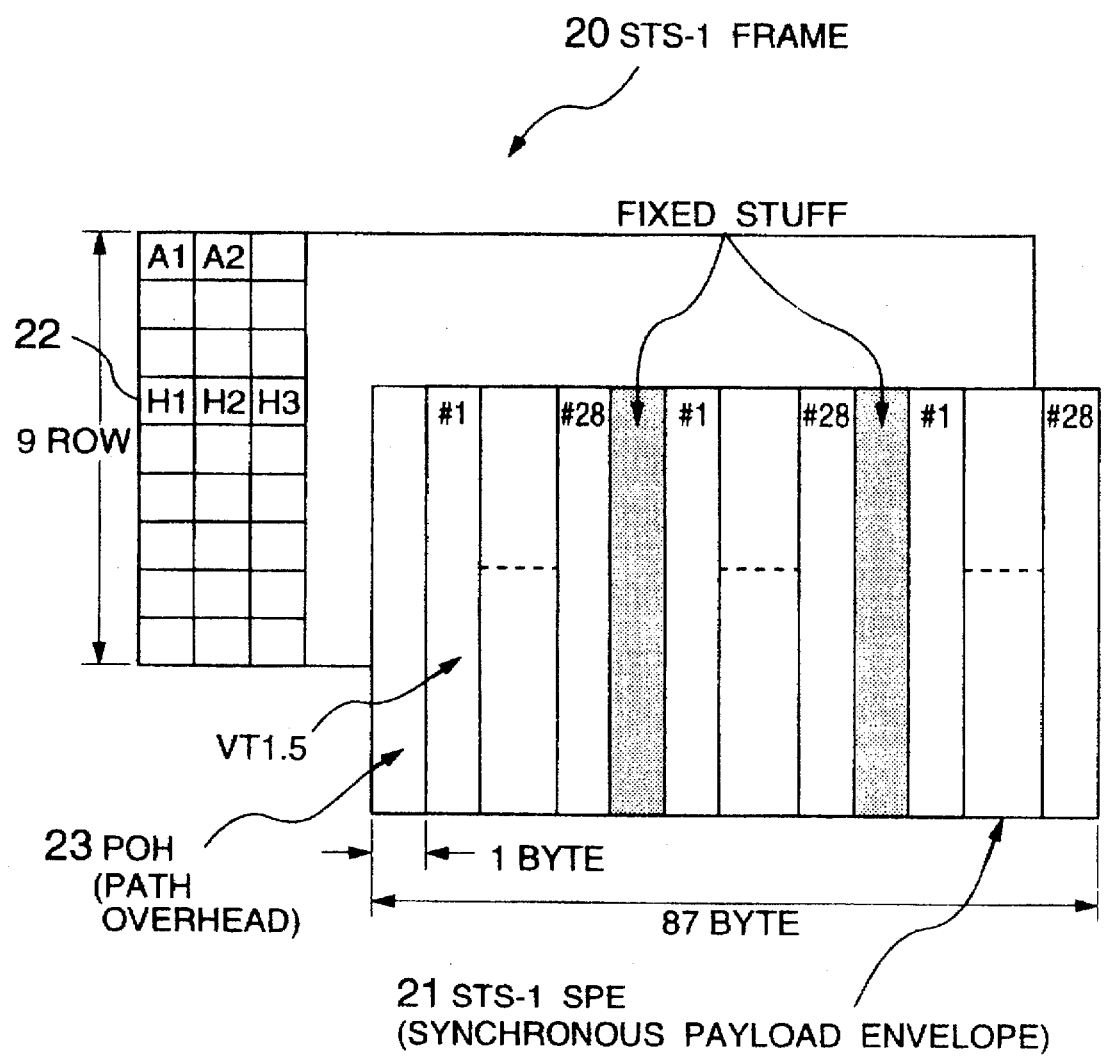
FIG. 1 is a schematic diagram illustrating the structure of a transmission frame used by SONET.
Figure 2:
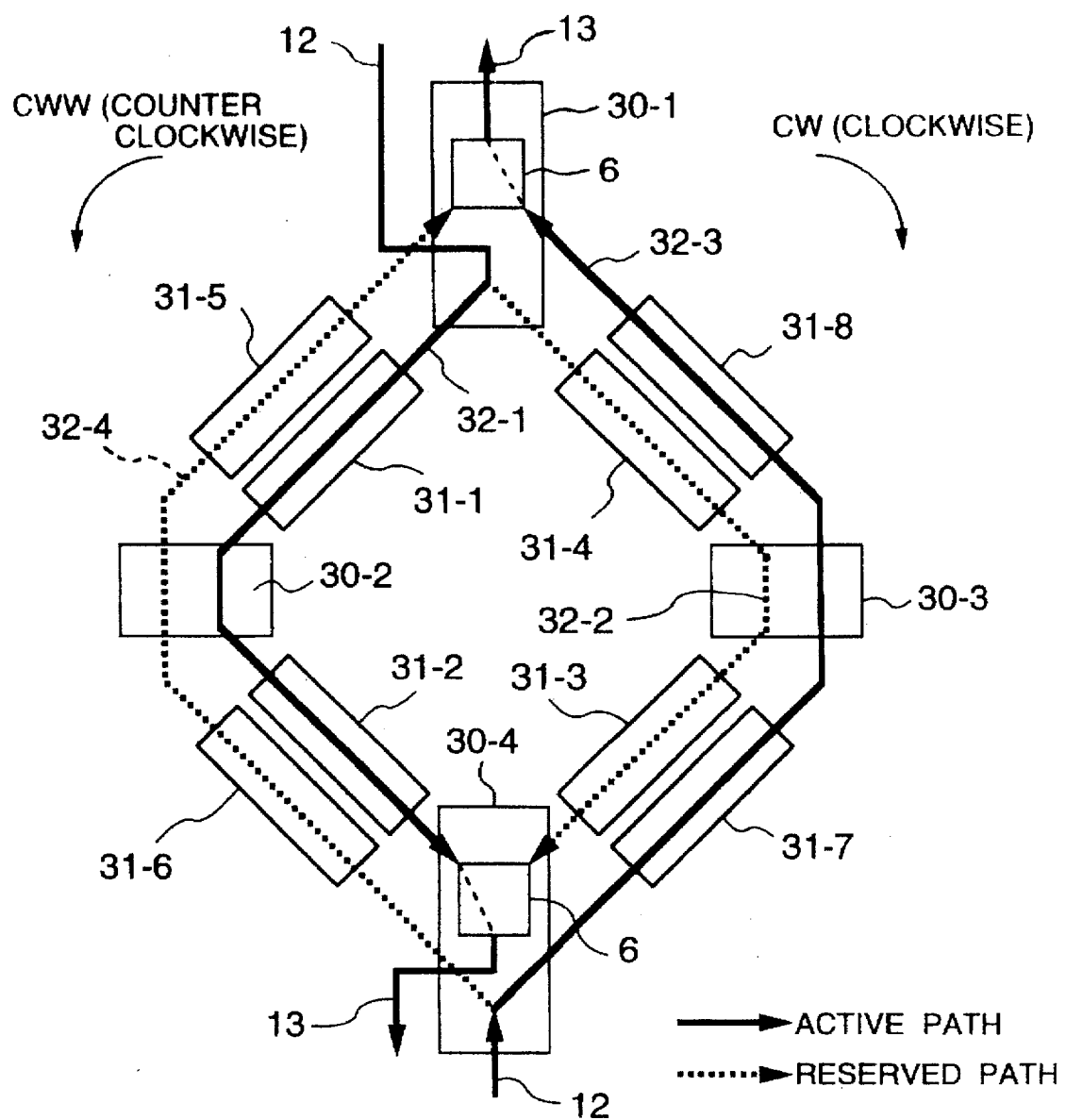
FIG. 2 is a schematic diagram showing the structure of a UPSR network.
Figure 3:
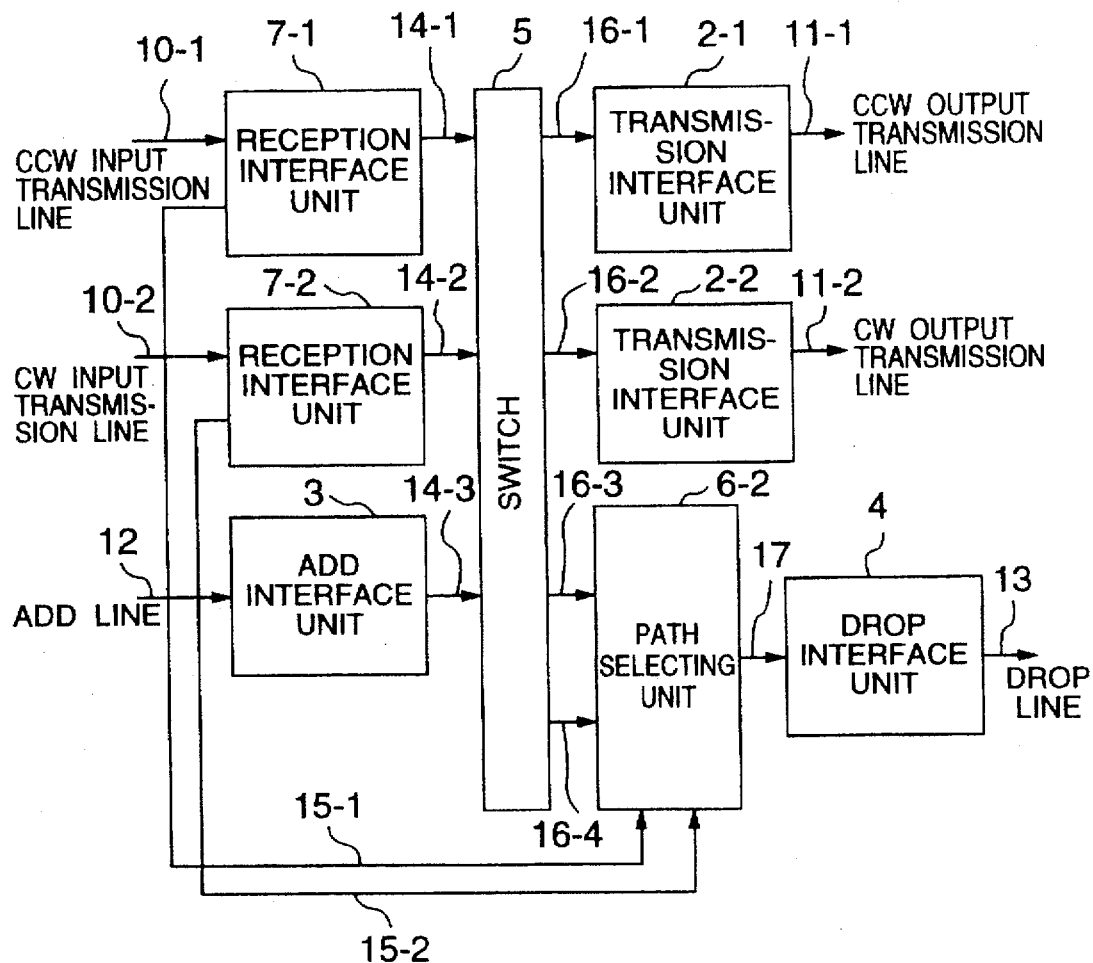
FIG. 3 is a block diagram showing the structure of a conventional node (transmission station).
Figure 4:
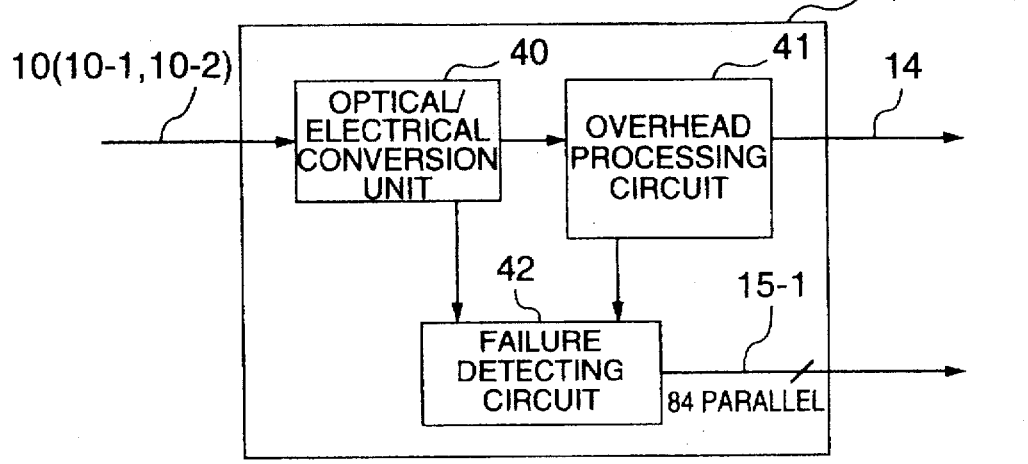
FIG. 4 is a block diagram showing the structure of a reception interface unit shown in FIG. 3.

The network applied to this invention is the same as a conventional network and it is an UPSR network shown in FIG. 2. This network interconnects nodes 30-1 to 30-4 by lines 31-1 to 31-8 constituting two paths. One of the two paths is used as an active path, and the other is used as a reserved path. Similar to the conventional network, the path in the counter clockwise (CCW) direction is used as the active path, and the path in the clockwise (CW) direction is used as the reserved path.

The type of the path used by the embodiment is assumed to be a VT1.5 signal path standardized by ANSI.

Assuming that the node shown in FIG. 5 is the node 30-4 of the network shown in FIG. 2, a CW input transmission line 10-2 corresponds to the line 31-3 of FIG. 2, a CCW input transmission line 10-1 corresponds to the line 31-2 of FIG. 2, a CW output transmission line 11-2 corresponds to the line 31-6 of FIG. 2, and a CCW output transmission line 11-1 corresponds to the line 31-7 of FIG. 2. Output highways 16-3 and 16-4 of the switch 5 transmit signals received from the active and reserved paths. The path selecting unit 6-1 selects either the active path or the reserved path. Each node accommodates the add line 12 and the drop line 13 in addition to the ring line.

It is assumed here that the node having the structure shown in FIG. 5 is used as the node 30-4 of the network shown in FIG. 2 and that a VT1.5 signal is received from the active path. The VT1.5 signal received at the node 30-4 from the active path 32-1 is subjected to an overheads termination process by the overheads processing circuit 41 of the reception interface unit 1-1, and passed to the switch 5. This active path 32-1 is connected via the highway 16-3 to the path selecting unit 6-1 with the help of the path setting function of the switch 5. Similarly, the reserved VT1.5 signal path 32-2 is connected via the highway 16-4 to the path selecting unit 6-1.

The path selecting unit 6-1 usually selects the active VT1.5 signal path 32-1 and connects it to the drop line transmission interface unit 4. Namely, a signal received from the highway 16-3 is transmitted over a highway 17. Signals on the active and reserved paths are outputted to two difference highways 16-3 and 16-4 at the same time with the help of the path setting function of the switch 5.

Next, a path switching operation of the node 30-4 will be described.

It is assumed that the line 31-1 between the nodes 30-1 and 30-2 on the network shown in FIG. 2 fails. In this case, a failure occurs on the active VT1.5 signal path 32-1, and this failure is detected by the failure detecting circuit 42 of the reception interface unit 1 (1-1, 1-2) which is constituted as shown in FIG. 6 by an optical/electrical conversion unit 40, the overheads processing circuit 41, the failure detecting circuit 42, and the path status identifier add circuit 43. The status of the failure on the VT1.5 signal path is written in a partial area (path status identifier) of an overheads field in the VT1.5 signal from which the failure was detected.

As shown in FIG. 7, in this embodiment of the invention, this path status identifier is loaded in a V4 field of the VT1.5 signal of SONET. The path status identifier in the V4 field takes a value "00000000" when a failure is still not detected and a value "00000001" when a failure is detected. Therefore, after a failure is detected, a value "00000001" is loaded in the path status identifier in the V4 field of a VT 1.5 signal on the active path 32-1.

As shown in FIG. 8, the path selecting unit 6-1 is constituted by the path status detecting circuits 44-1 and 44-2 respectively provided for the active and reserved paths, the control circuit 46, the selector 45, the timing generating circuit 48, and the route selection information storing memory 47. The operation of the path selecting unit 6-1 is controlled by a CPU 49.

When the VT1.5 signal of the active path 32-1 having the path status identifier "00000001" reaches the path selecting unit 6-1, the path status identifier detecting circuit 44-1 of the path selecting circuit 6-1 checks whether the information of the path status identifier has changed or not.

As described earlier, both the signal 24-1 on the active path and the signal 24-1 on the reserved path reach the path selecting unit 6-1 at the same time. The path status identifier detecting circuit 44-1 notifies a change of the active path status identifier to a value "00000001", to the control circuit 46. Upon reception of the notice that the path status identifier of the currently selected path has changed to "00000001", the control circuit 46 knows that a failure has occurred on the currently selected active VT1.5 signal path, and so operates to select the reserved VT1.5 path.

The route selection information storing memory 47 has storage areas same in number as the number of paths to be switched, and stores identification information ("0" or "1") of a route of a switched path. The number of storage areas is equal to the number of VT1.5 signal paths to be switched, and in the case of STS-3, there are eighty four storage areas. These storage areas are mapped in the route selection information storing memory 47 in the order of signals on paths reaching the highways 16-3 and 16-4. Values stored in these storage areas are read in response to timing signals generated by the timing generating circuit 48. The selector 45 selects an input port in accordance with the value read from the route selection information storing memory 47, and connects it to the output highway.

Namely, when the value read from the route selection information storing memory 47 is "0", input highway 18-1 for active path signals is selected, and when the value read from the memory 47 is "1", input highway 18-2 for reserved path signals is selected.

The control circuit 46 has a RAM and a ROM, and the logic illustrated in FIG. 9 is written in a partial area of ROM. When the path status identifier detecting circuit 44-1, 44-2 detects a change in the path status identifier, the control circuit 46 updates the contents of the route selection information storing memory 47 under the control of CPU, in accordance with the logic illustrated in FIG. 9. Specifically, if the path status identifiers of both the active and reserved paths are "00000000" representative of no failure detection, the control circuit 46 does not update the route selection information storing memory 47 and maintains the current conditions. If the path status identifier of the active path is "00000000" and the path status identifier of the reserved path is "00000001" representative of a failure detection, the control circuit 46 updates the route selection information storing memory 47 in order to select the input highway 18-1 which corresponds to the active path. If the path status identifier of the active path is "00000001" and the path status identifier of the reserved path is "00000000", the control circuit 46 updates the route selection information storing memory 47 in order to select the input highway 18-2 which corresponds to the reserved path. If the path status identifiers of both the active and reserved paths are "00000001", the control circuit 46 maintains the current conditions.

FIGS. 10 and 11 illustrate path selection logic according to another embodiment of the invention. For the purpose of improving service quality, SONET stipulates path selection logic that a path having less significant failure should be selected if both the active and reserved paths failed.

In this embodiment, a path is selected depending upon the level of failure. In this embodiment, a level of path failure is classified into hard failure and soft failure. In the case of a path at a VT level of SONET, the hard failure is that signals on the path are transmitted not at all, and includes VT loss of pointer (VT LOP) and VT alarm indication signal (VT AIS). The soft failure corresponds to VT signal degrade (VT SD) indicating that a bit error rate of a VT level signal has deteriorated lower than a predetermined value. FIG. 10 shows examples of path status identifiers discriminating between hard and soft failures, each path status identifier storing a coded V4 byte. With the coding logic of the path status identifiers shown in FIG. 10, the path selecting unit 6-1 can be notified of a path having significant failure as the hard failure, and a path having less significant failure as the soft failure.

Next, the selection logic of the path selecting unit of this embodiment will be described with reference to FIG. 11. In FIG. 11, a level of path failure is classified into two levels including hard failure and soft failure. The basic rules of the path selection logic are as follows.

(1) A currently selected path is maintained if a failure is not detected (normal state) on both the paths.

(2) A path on which no failure was detected is selected if a failure is not detected (normal state) on one path and a failure is detected on the other path.

(3) A currently selected path is maintained if a failure of the same level is detected on both the paths.

(4) A path having less failure (soft failure) is selected if failures of different levels are detected on both the paths.

The selection logic may be performed by writing them in advance in ROM of the control circuit 46 of the path selecting unit 6-1 shown in FIG. 5.

In the above embodiments, although the path status identifier is loaded in V4 of a VT1.5 signal, the path status identifier may be loaded in V1 of a VT1.5 signal. In this case, all "1s" are loaded in V1 of a received VT1.5 signal when a failure is detected on a path, or all "1s" may be loaded in the V1 fields of all VT1.5 signals on its route.

In the above embodiments, although a VT1.5 signal path is used, other paths such as VT2, VT3, and VT6 may also be used. The STS-1 signal path may also be switched in the similar manner described above.

In the case of switching STS-1 signal paths, the path status identifier may be loaded in the field of an H1 pointer byte. Specifically, all "1s" are loaded in the H1 pointer byte field of a received signal when a failure is detected on a path, or all "1s" may be loaded in the H1 pointer byte fields of all signals on its route. The path status identifier may be loaded in a fixed stuff field.

Also in the above embodiments, two routes including the active and reserved paths are set for lines which interconnect nodes. Three or more route paths may also be set. In this case, a priority order may be assigned to route paths not currently selected, and if the path status identifier in a signal on a currently selected path indicates a detection of failure on the currently selected path, a route path having a highest priority order is selected from those route paths not currently selected.

Figure 12:
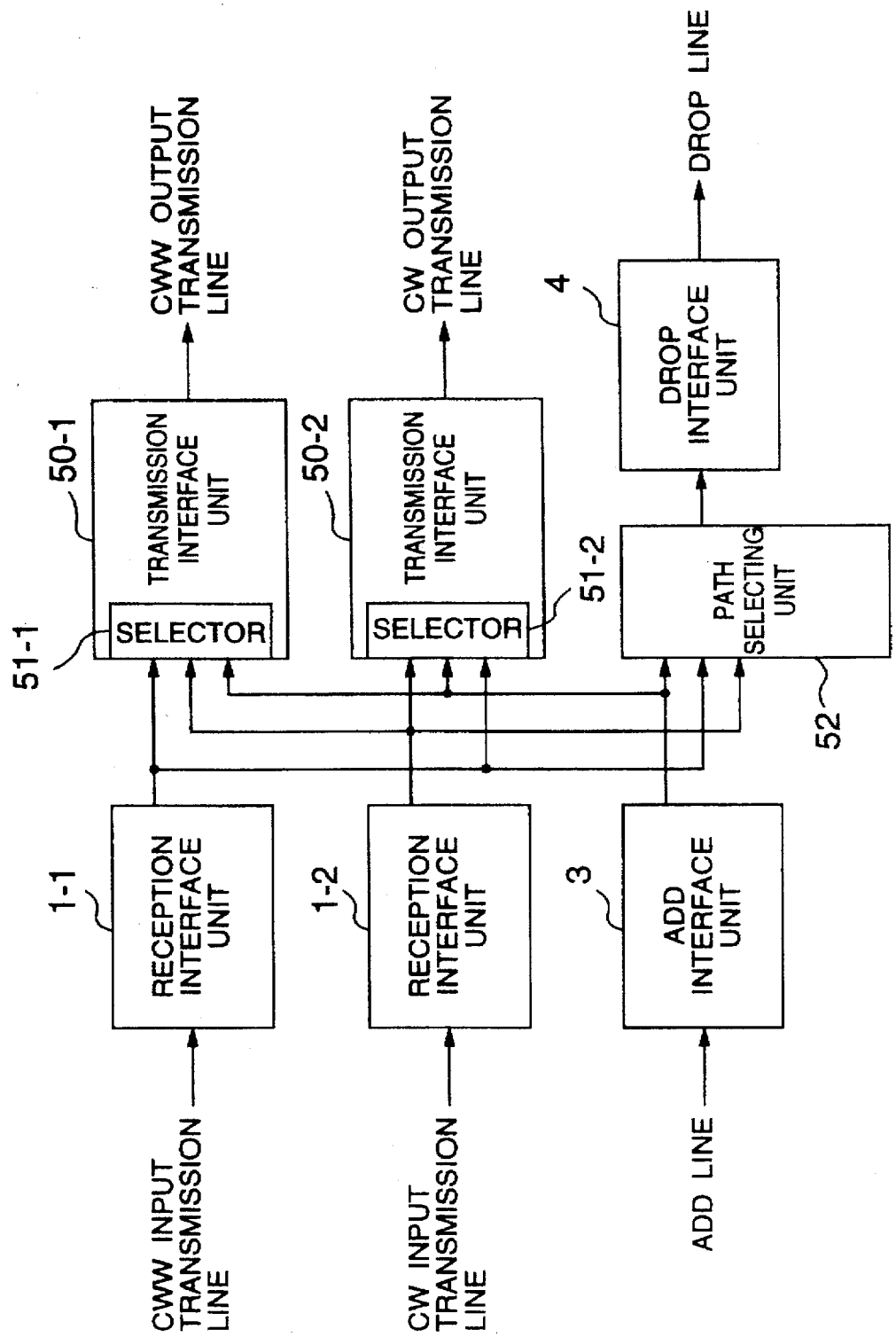
FIG. 12 is a block diagram showing the structure of a node according to another embodiment of the invention.

FIG. 12 is a block diagram showing the structure of a node according to another embodiment of the invention. Circuit portions having the same function as that shown in FIG. 5 are represented by using identical reference numerals and the description thereof is omitted. A different point from the node shown in FIG. 5 is that a function of the switch 5 is allocated to reception interface units 50-1 and 50-2. Signals received on paths of CCW and CW input transmission lines are directly inputted to the transmission interface units 50-1 and 50-2, selected by selectors 51-1, 51-2, and outputted to CCW and CW output transmission lines.

A path selecting unit 52 selects one of the paths in accordance with the information of the path status identifier and predetermined selection logic, and transmits data via a drop interface unit 4 to a drop line.

The logic illustrated in FIGS. 9 to 11 may be used as the predetermined selection logic.

What is claimed is:

1. A method of switching a plurality of route paths of a network in which a plurality of route paths for signal transmission are set, wherein in said network a transmission station on a transmission side transmits information having same contents to said plurality of route paths, a transmission station on a reception side selects one of said plurality of route paths based on information indicating statuses of failure of signals on said plurality of route paths, so that a signal not influenced by failure or a signal less influenced by failure relative to the other signals can be output, said method comprising the steps of:

detecting failures with respect to a plurality of signals received on each of said plurality of route paths by monitoring a pointer and a path overhead of each of said signals in a first portion of said transmission station on the reception side;

when a failure is detected with respect to at least one of said plurality of signals, loading failure information as a path status identifier in a predetermined field of said at least one of said plurality of signals, said failure information indicating a status of the failure detected;

transmitting said plurality of signals, including said at least one of said plurality of signals loaded with said failure information, to a second portion of said transmission station on the reception side, said plurality of signals flowing from said first portion to said second portion; and selecting, in said second portion of said transmission station, one of said plurality of route paths in accordance with said failure information loaded in said at least one of said plurality of signals and a predetermined logic.

2. A method of switching a route path according to claim 1, wherein said predetermined logic assigns a priority order to route paths not currently selected, and if said path status identifier in a signal on a currently selected path indicates a detection of failure on said currently selected path, said step of selecting one of said plurality of route paths selects a route path having a highest priority order from those route paths not currently selected.

3. A method of switching a route path according to claim 1, wherein if two route paths are set as said plurality of route paths and if said path status identifier in a signal on a currently selected route path indicates a detection of failure of said currently selected route path and said path status identifier in a signal of a route path not currently selected does not indicate a detection of failure of said route path not currently selected, said step of selecting one of said plurality of route paths selects said route path not currently selected.

4. A method of switching a route path according to claim 1, wherein said step of loading the failure information includes the steps of:

discriminating whether a failure is significant or less significant; and indicating a level of said failure on the basis of results of said step of discriminating.

5. A method of switching a route path according to claim 4, wherein if two route paths are set as said plurality of route paths, said step of selecting one of said plurality of route paths includes the steps of:

(1) maintaining a currently selected path if a failure is not detected on both the two route paths;

(2) selecting a route path on which no failure has been detected if a failure is not detected on one route path and a failure is detected on the other route path;

(3) maintaining a currently selected path if a failure of the same level is detected on both the two route paths; and (4) selecting a path having less significant failure if failures of different levels are detected on both the two route paths.

6. A method of switching a route path according to claim 1, wherein said step of loading the failure information sets "1" to at least one bit in V4 of a VT1.5 signal when a failure is detected on a route path.

7. A method of switching a route path according to claim 1, wherein said failures are path failures.

8. A method of switching a route path according to claim 1, wherein said failures are line failures.

9. A method of switching a route path according to claim 1, wherein said failures are line failures and path failures.

10. A method of switching a route path according to claim 1, wherein said step of loading failure information includes a step of multiplexing said failure information into said at least one signal.

11. A method of switching a route path according to claims 10, wherein said step of multiplexing includes a step of multiplexing one of path failure information and line failure information into said at least one signal.

12. A method of switching a route path according to claim 11, wherein said step of multiplexing includes a step of multiplexing path failure information and line failure information into said at least one signal.

13. A method of switching a route path according to claim 1, wherein said failure is detected on an STS-level of said network.

14. A method according to claim 1, wherein said network is a uni-directional path switch ring network.

15. An apparatus for controlling switching of a plurality of route paths of a network in which a plurality of route paths for signal transmission are set, wherein in said network a transmission station on a transmission side transmits information of same contents to said plurality of route paths, a transmission station on a reception side selects one of said plurality of route paths based on information indicating statuses of failure of signals on said plurality of route paths, so that a signal not influenced by failure or a signal less influenced by failure relative to the other signals can be output, said apparatus for controlling switching of a plurality of route paths comprising:

means for detecting failures with respect to a plurality of signals received on said plurality of route paths by monitoring a pointer and a path overhead of each of said plurality of signals;

means for loading, when a failure is detected with respect to at least one of said plurality of signals, failure information as a path status identifier in a predetermined field of said at least one of said plurality of signals, said failure information indicating a status of the failure detected;

means for transmitting said plurality of signals, including said at least one of said plurality of signals containing said failure information, to a second portion of said transmission station on the reception side, said signals flowing from said first portion to said second portion; and means, in said second portion of said transmission station, for selecting one of said plurality of route paths in accordance with said failure information loaded in said at least one of said plurality of signals by said means for loading and predetermined logic.

16. An apparatus for controlling switching of a route path according to claim 15, wherein said predetermined logic assigns a priority order to route paths not currently selected, and if said path status identifier in a signal on a currently selected path indicates a detection of failure on said currently selected path, said means for selecting one of said plurality of paths selects a route path having a highest priority order from those route paths not currently selected.

17. An apparatus for controlling switching of a route path according to claim 15, wherein if two route paths are set as said plurality of route paths and if said path status identifier in a signal on a currently selected route path indicates a detection of failure of said currently selected route path and said path status identifier in a signal of a route path not currently selected does not indicate a detection of failure of said route path not currently selected, said means for selecting one of said plurality of route paths selects said route path not currently selected.

18. An apparatus for controlling switching of a route path according to claim 15, wherein said means for loading the failure information includes means for discriminating whether a failure is significant or less significant and means for indicating a level of said failure on the basis of results obtained in said means for discriminating.

19. An apparatus for controlling switching of a route path according to claim 18, wherein if two route paths are set as said plurality of route paths, said means for selecting one of said plurality of route paths operates according to the following logic:

(1) maintaining a currently selected path if a failure is not detected on both the two route paths;

(2) selecting a route path on which no failure has been detected if a failure is not detected on one route path and a failure is detected on the other route path;

(3) maintaining a currently selected path if a failure of the same level is detected on both the two route paths; and (4) selecting a path having less significant failure if failures of different levels are detected on both the two route paths.

20. An apparatus for controlling switching of a route path according to claim 15, wherein said network is a ring network having two different route paths and transmission stations interconnected by lines in a ring shape.

21. An apparatus for controlling switching of a route path according to claim 15, wherein said means of loading the failure information sets "1" to at least one bit in V4 of a VT1.5 signal when a failure is detected on a route path.

22. An apparatus for controlling switching of a route path according to claim 15, wherein said failures are path failures.

23. An apparatus for controlling switching of a route path according to claim 15, wherein said failures are line failures.

24. An apparatus for controlling switching of a route path according to claim 15, wherein said failures are line failures and path failures.

25. An apparatus for controlling switching of a route path according to claim 15, wherein said loading means includes means for multiplexing said failure information into said at least one of said plurality of signals.

26. An apparatus for controlling switching of a route path according to claim 25, wherein said multiplexing means multiplexes one of path failure information and line failure information into said at least one of said plurality of signals.

27. An apparatus for controlling switching of a route path according to claim 26, wherein said multiplexing means multiplexes path failure information and line failure information into said at least one of said plurality of signals.

28. An apparatus for controlling switching of a route path according to claim 15, wherein said failure is detected on an STS-level of said network.

29. The apparatus of claim 15, wherein said network is a uni-directional path switch ring network.

* * * * *